Jan. 23, 1962    R. K. LADISCH    3,017,664
FIBER-FORMING NOZZLE AND METHOD OF MAKING FIBERS
Filed Aug. 1, 1957
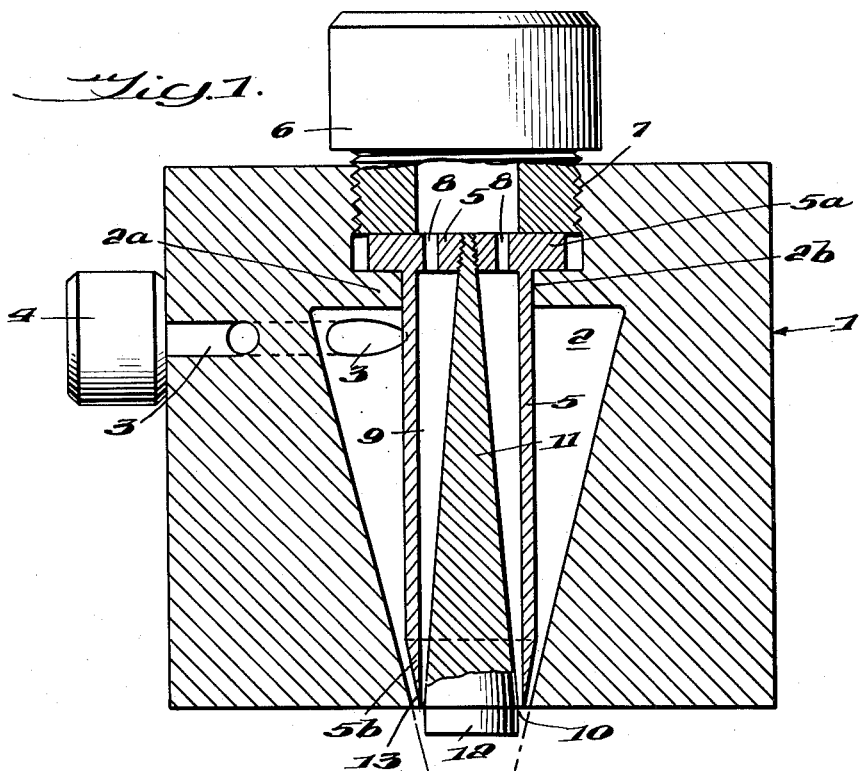
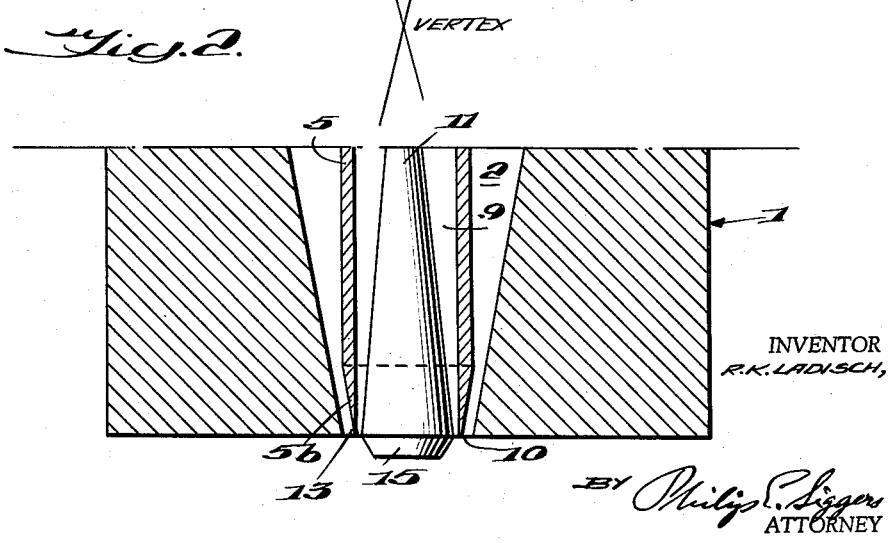
INVENTOR
R. K. LADISCH,
BY Philip C. Siggers
ATTORNEY

United States Patent Office 3,017,664
Patented Jan. 23, 1962

3,017,664
FIBER-FORMING NOZZLE AND METHOD
OF MAKING FIBERS
Rolf K. Ladisch, 255 Windermere Ave., Lansdowne, Pa.
Filed Aug. 1, 1957, Ser. No. 675,710
12 Claims. (Cl. 18—2.5)

This invention relates to a fiber-forming nozzle and a method for the economical production of fine fibers from fiber-forming liquids, such as inorganic glass or organic plastics.

Fibers, particularly from inorganic glass, have heretofore been produced by several processes which include flowing a stream of fiber-forming liquid into a blast of steam or air. The stream is disrupted into a multiplicity of particles by the atomizing action of the blast. Most of these particles are then attenuated into fibers by the force of the blast. The production of fine fibers of a relatively uniform quality by these processes is difficult and expensive for several reasons. The stream of fiber-forming liquid must have a very low viscosity to minimize solidification before the fibers are formed. With materials solidifying at high temperatures, such as inorganic glass, intensely hot auxiliary gas is sometimes used to envelop the fiber-forming liquid and the blast of air or steam in order to maintain a sufficiently high temperature within the space in which the fibers are formed. This necessitates the use and the concomitant expense of large quantities of intensely hot auxiliary gas. With heat-softenable organic materials, such as synthetic organic resins, these processes are, in general, not suited for the production of fine fibers of a uniform quality. Such materials usually do not have a sufficient thermal stability to convert them into the required fiber-forming liquids having a low viscosity. From a more basic point of view, these processes do not lend themselves particularly to the production of any fine fibers of a very uniform quality. They operate on the principle that the fiber-forming liquid is initially shattered into particles by the force of the stream of air or steam, whereupon the individual particles are attenuated into fibers by the force of the blast in a haphazard manner. These processes, therefore, lack a smooth drawing action on the body of fiber-forming liquid to form the fibers.

A primary object of the present invention is the production of fine fibers from fiber-forming liquids, such as inorganic glass or organic resins, by a process which is free of the above difficulties and limitations.

One of the principal objects of this invention is to provide a fiber-forming nozzle wherein a fiber-forming liquid, such as a melt of inorganic glass or organic resin, is spread over the outside wall of a circular body as a thin film, and wherein a stream of spiraling elastic fluid rotates around this film with a very high velocity to create a vacuum between the film and the elastic fluid. Mainly through the suction exerted by the spiraling elastic fluid, fibers are picked up from the film of fiber-forming liquid, the fibers being drawn out to fineness in the elastic fluid. This feature renders it possible to produce fine fibers of a great uniformity and a very high quality, the fibers being substantially free of imperfections, such as coarse particles or "shot."

Another object of this invention is to provide means whereby fibers are drawn out to fineness by traveling in a long spiral path of elastic fluid merely a short distance away from the body supplying the fiber-forming liquid. This feature is particularly advantageous with materials solidifying at a high temperature, since the size of the space in which the fibers are drawn is kept at a minimum and, therefore, the loss of heat from this very small space is also kept at a minimum.

A further object of this invention is to produce inherently curly fibers by drawing them out in a spiraling elastic fluid. This increases the usefulness of such fibers for many purposes over fibers being substantially straight, as is well known in the art.

A still further object of this invention is to supply a fiber-forming liquid to a spiraling elastic fluid at a viscosity at which the material is substantially thermally stable, and to superheat the elastic fluid sufficiently to further lower the viscosity of the fiber-forming liquid substantially within a very short period of time, e.g., generally within a fraction of a second, before and while the fibers are drawn out to fineness. This feature is particularly useful with organic fiber-forming liquids which will endure transitional overheating such as referred to, but which may decompose even when heated at lower temperatures over longer periods of time.

The foregoing as well as other objects and advantages of this invention will become more apparent as this description proceeds, especially when considered in connection with the accompanying drawing forming a part of this specification.

In said drawing—

FIG. 1 is a longitudinal section through the preferred form of nozzle for practicing the method of this invention; and FIG. 2 is a fragmentary longitudinal section through the nozzle showing a modification of the body on which the fiber-forming liquid is caused to flow as a film.

The preferred nozzle comprises a body 1 having a hollow frusto-conical chamber 2 on the inside and having an inlet 3 for an elastic fluid opening tangentially at the larger end of said chamber (which is closed) with a coupling 4 to couple a supply pipe of elastic fluid (not shown) to the nozzle. The elastic fluid supplied may be compressed air, steam, nitrogen or any other gas or vapor, which does not chemically interfere with fiber and/or filament formation from fiber-forming liquids under the conditions obtaining. Generally, the elastic fluid will be heated. The nozzle body 1 may be insulated (not shown) by a layer of insulation against heat loss. At higher temperatures of operation, the nozzle may be heated by a heating element, not shown. Arranged coaxially of the frusto-conical chamber 2 is a feed tube 5 which is secured in body 1 by means of a coupling 6 screwed into body 1 at 7. Coupling 6 when screwed in bears against a flange 5a integral with the upper end of feed tube 5. A collar 2a formed in body 1 supports flange 5a and receives the thrust from coupling 6 when the coupling is screwed in, so that the feed tube is rigidly supported. The upper end of the feed tube, underneath flange 5a, fits closely in an aperture 2b formed in collar 2a, so that chamber 2 is sealed at its upper end, except for inlet 3. The lower end of the feed tube is beveled as at 5b to give the proper clearance for flow of the elastic fluid out of chamber 2. Coupling 6 may be connected to a supply of fiber-forming liquid (not shown), such as, for instance, a plastics extruder delivering a stream of organic thermoplastic at a desired rate and a desired degree of fluidity, as is well understood in the art. Feeding of the fiber-forming liquid to the nozzle by gravity may be employed when producing fibers from highly fluid fiber-forming liquids, such as inorganic glass or several of a number of organic thermoplastics having a low or medium molecular weight, which latter may be liquefied to a sufficient degree without substantial decomposition. To feed the fiber-forming liquid by gravity, coupling 6 is connected to a container (not shown) with a supply of sufficiently fluid fiber-forming liquid. The container may be heated and kept at a desired temperature by any suitable means, such as electrical heating elements or gases of combustion, to prevent the fiber-forming liquid from becoming more viscous and, thus, to maintain an uninterrupted flow of fiber-forming liquid to the nozzle. Generally, the fiber-forming liquid in the container will be held at a level above that of the nozzle and may be raised upward to increase the rate of flow of fiber-forming liquid to the nozzle. However, the level of the fiber-forming liquid may also be adjusted to the height at which the nozzle is positioned or even substantially lower. Good results have been obtained, for instance, with the level of the fiber-forming liquid being approximately 8 inches lower than the lowest part of the nozzle. This arrangement is rendered possible by the fact that the nozzle exerts an appreciable pulling force on the stream of fiber-forming liquid within feed tube 5 when operating under a stream of compressed elastic fluid, as will be more fully explained hereinafter.

Feed tube 5 is generally cylindrical and is closed at its upper end except for a number of small ports or holes 8 which permit feeding of the fiber-forming liquid into bore 9, the latter being straight throughout its length. Bore 9 of feed tube 5 is restricted by a member 11 which is a substantially frusto-conical body supported coaxially of the feed tube with its larger end positioned toward discharge end 10. Member 11 has its upper smaller end secured as by screw threads 11a in a tapped bore provided centrally of flange 5a. The frusto-conical body 11 terminates in a substantially cylindrical portion 12 which projects somewhat beyond discharge end 10. The outer walls of member 11 and the inner walls of bore 9 form a narrow annular discharge opening for the fiber-forming liquid. In general, the smaller the width of this discharge opening, the finer will be the fibers produced. Micro-fibers ranging in average fiber diameter from about one to eight microns have been obtained from a number of organic thermoplastics, such as polystyrene and polyethylene, with discharge openings having widths of 150 to 350 microns. However, greater or smaller widths may be employed depending on other operating characteristics of the described process, such as the degree of fluidity of the fiber-forming liquid and the desired rate of output as well as the desired average fiber diameter. Good results have been obtained with a projection of cylindrical portion 12 of approximately 3/32 of an inch beyond discharge point 10, but it will be understood that the present invention is not limited to a particular projection of portion 12 beyond discharge point 10.

Although the mode of fiber formation with the process described herein is not fully understood, conclusions about some features of the process may be drawn almost with certainty. It will be noted that the nozzle delivers a spiraling flow of elastic fluid through the narrow annular opening 13, which is defined by the outside beveled walls 5b of feed tube 5 and the inside walls of chamber 2 at the latter's smaller end as shown in the drawing. The elastic fluid travels at a very high and constantly increasing velocity and may attain supersonic velocity. It will be further noted that the stream of elastic fluid is directed toward a point outside the nozzle marked "Vertex," the elastic fluid forming a hollow cone and spiraling in the direction of the tip or "Vertex" of the cone. It has been observed that the spiraling elastic fluid tends to assume the shape of a hollow cone in the described embodiment of the invention even when cylindrical portion 12 of member 11 protrudes substantially beyond discharge opening 10, and when, as a consequence, the elastic fluid is forced to spiral around cylindrical portion 12 transitionally in a cylindrical path after its discharge from annular opening 13. This is interpreted to mean that a partial vacuum is created within the spiraling stream of elastic fluid and that the atmospheric pressure of the ambient air pushes the elastic fluid into this vacuum to form first a tight envelop of spiraling gas around the cylindrical portion 12 of member 11, and then a substantially hollow cone of spiraling gas in front of portion 12 within mid-air. Measurements of the pulling force of the nozzle operating under a stream of compressed air have substantiated this belief. It has been found that the pressure at coupling 6 is lower by up to 30 inches, water column, versus the atmospheric pressure when the nozzle is connected at coupling 4 to a supply of compressed air having a pressure between 20 and 125 pounds per square inch. Accordingly, the fiber-forming nozzle of this invention will exert a substantial suction on the fiber-forming liquid which is discharged at discharge end 10, and the fiber-forming liquid will be spread out over the cylindrical wall of portion 12 of member 11. Simultaneously, the spiraling elastic fluid will pick up material from this film of fiber-forming liquid on said portion 12, to form the fibers and to draw them out to fineness.

Having described the fiber-forming nozzle and the method of making fibers of this invention, it will be apparent to those skilled in the art that the described nozzle may be modified in various ways within the scope of this invention. For example, the projecting portion of member 11 may be shaped in the form of a truncated cone 15, as shown in FIG. 2, the cone having its base near discharge opening 10 and having a vertex angle substantially the same as the vertex angle of said conical path of spiraling elastic fluid. Or the body 1 of the nozzle may have on its inside a substantially straight bore instead of the frusto-conical hollow chamber, the main criterion being that the elastic fluid will travel in a spiral path at a very high speed after having been discharged from the nozzle. Obviously, the nozzle shown in a vertical position may be arranged and operated in a horizontal position to facilitate collecting the fiber masses thus produced and to deposit the fibers in mats or the like.

I claim:

1. Fiber-forming nozzle for producing fibers from fiber-forming liquids comprising a body having on its interior a frusto-conical chamber closed at its upper end and open at its lower end, means for coupling the upper end of the chamber tangentially to a supply of elastic fluid, a substantially cylindrical feed tube extending axially through the chamber, the lower end of the feed tube substantially coinciding with the plane of the lower end of the chamber to form an annular discharge opening for the elastic fluid between the outside wall of the feed tube and the inside wall of the chamber, means for coupling the upper end of the feed tube to a supply of fiber-forming liquid, and a body within the feed tube arranged so that it restricts the flow of fiber-forming liquid to an annular feed opening at the lower end of the feed tube between the outside wall of said body and the inside wall of the feed tube, said body that is within the feed tube protruding somewhat beyond the feed tube, the outside wall of the protruding portion of said body being adapted to receive a film of fiber-forming liquid from said feed tube.

2. The invention defined in claim 1, wherein the protruding portion of said body is substantially cylindrical.

3. The invention defined in claim 1, wherein the protruding portion of said body has substantially the shape of a truncated cone, the smaller end of the truncated cone forming the free end of said body.

4. A nozzle for forming fibers from fiber-forming liquids comprising, in combination, a hollow nozzle body; means for connecting a source of elastic fluid under pressure to the interior of said nozzle body; means for causing the elastic fluid to flow in a spiral path within the nozzle body with ever increasing velocity towards a point outside of the nozzle body, the spiral path forming a hollow cone whose vertex is said point; a solid body rigidly fixed to said nozzle body and lying almost entirely within the nozzle body but having one end portion projecting outside the nozzle body, said projecting end portion lying wholly within said hollow cone and being of circular cross section and substantially coaxial with said hollow cone; means connecting said nozzle body with a source of fiber-forming liquid; and means within said nozzle body for directing the flow of fiber-forming liquid from said source to the surface of said projecting end portion without contact with the spiraling elastic fluid before said surface is reached, said liquid as it reaches said surface forming a film which is acted on by the hollow cone of elastic fluid to pick up fibers and draw them out to fineness in the elastic fluid.

5. A nozzle for forming curly fibers from fiber-forming liquids comprising, in combination, a body having a frusto-conical chamber whose smaller end is open and terminates at one face of the body; means for introducing a stream of elastic fluid under pressure tangentially into said chamber at its larger end, which is closed, so that said elastic fluid moves in a spiral path with ever increasing velocity down to and out of the smaller end of said chamber; a hollow feed tube fixed to said body and lying within and extending axially of said chamber; means for passing a fiber-forming liquid through said hollow feed tube; the discharge end of said feed tube being about in the plane of said smaller chamber end but spaced from and surrounded by the walls thereof so that a narrow annular opening is provided therebetween for discharge of the elastic fluid; and means fixed inside said hollow feed tube to provide a narrow annular discharge opening for the liquid flowing through said feed tube; said fixed means also projecting beyond the last named discharge opening and providing a rounded solid surface for the fiber-forming liquid to flow over as a film, said rounded surface lying on the inside of the conical path of the spiraling elastic fluid flowing from said chamber.

6. The invention defined in claim 5 wherein the rounded surface is cylindrical.

7. The invention defined in claim 5 wherein the rounded surface is a truncated cone whose larger end is nearer the nozzle body and whose vertex angle is substantially the same as the vertex angle of said conical path of spiraling elastic fluid.

8. The invention defined in claim 5 wherein the hollow feed tube is cylindrical and is fixed to the nozzle body outside of said chamber by means of its upper end, said feed tube being readily removable, the lower end of the feed tube being beveled on the outside surface and tapering to a circular edge where said narrow annular opening is provided for discharge of said elastic fluid.

9. The invention defined in claim 5, wherein the hollow feed tube has a flanged upper end; a coupling being screwed into said body and bearing at one end against said flanged end; the body having a collar for receiving the thrust of the flange when the coupling is screwed down tightly against it; the hollow feed tube having ports at its flanged end through which the fiber-forming liquid may flow; said coupling being adapted to connect with a source of fiber-forming liquid.

10. The invention defined in claim 5, wherein the hollow feed tube is cylindrical and is fixed at its upper end to the body; fixed means being an elongated frusto-conical member fixed at its smaller end to the upper end of said feed tube and extending co-axially thereof but spaced from the inner walls thereof; said elongated frusto-conical member providing said rounded surface for the films of fiber-forming liquid.

11. The invention defined in claim 10, wherein the upper end of the hollow feed tube has ports for the admission of the fiber-forming liquid; the smaller end of the elongated frusto-conical member being screwed into the upper end of the feed tube centrally of said upper end, with said ports arranged symmetrically around said screwed smaller end.

12. A method of forming commercial fibers or filaments which comprises causing an elastic fluid to flow with very high and ever increasing velocity in a spiral path towards a point, said spiral path defining a hollow cone whose vertex is said point; causing a fiber-forming liquid to flow as a thin film onto the smooth surface of a fixed solid circular wall which is located inside and is co-axial with said hollow cone; the kinetic energy and the relative position of the elastic fluid in said hollow cone being such that said elastic fluid picks up a multitude of minute drops from the thin film of fiber-forming liquid on said smooth surface and attenuates the minute drops into fibers, draws out the fibers to fineness, and discharges the fibers fully formed.

References Cited in the file of this patent
UNITED STATES PATENTS

| | | |
|---|---|---|
| 1,811,637 | Ladisch | June 23, 1931 |
| 2,072,375 | McCallum | Mar. 2, 1937 |
| 2,564,060 | Gettins | Aug. 14, 1951 |
| 2,571,457 | Ladisch | Oct. 16, 1951 |
| 2,663,903 | Stalego | Dec. 29, 1953 |
| 2,722,718 | Siu | Nov. 8, 1955 |
| 2,814,832 | Stephens | Dec. 3, 1957 |
| 2,868,587 | Hegmann | Jan. 13, 1959 |